United States Patent [19] [11] 4,158,966
Beckman [45] Jun. 26, 1979

[54] CASE HARDENED THERMOMETER

[76] Inventor: Paul Beckman, Tarry Knolls, Apt. 6-D, 414 Benedict Ave., Tarrytown, N.Y. 10591

[21] Appl. No.: 819,262

[22] Filed: Jul. 27, 1977

Related U.S. Application Data

[63] Continuation-in-part of Ser. No. 620,586, Oct. 8, 1975, Pat. No. 4,044,614.

[51] Int. Cl.² ............................................. G01K 1/08
[52] U.S. Cl. ........................................ 73/371; 264/22
[58] Field of Search .................... 73/371, 374; 264/22; 427/44

[56] References Cited

U.S. PATENT DOCUMENTS

| | | | |
|---|---|---|---|
| 2,677,965 | 5/1954 | Saffir | 73/374 X |
| 2,805,072 | 9/1957 | Smith | 264/22 |
| 3,247,012 | 4/1966 | Burlant | 427/44 |
| 3,490,287 | 1/1970 | Coben | 73/371 |
| 3,623,940 | 11/1971 | Gladstone | 427/44 |
| 3,711,391 | 1/1973 | Feinberg | 427/44 |

Primary Examiner—Herbert Goldstein
Attorney, Agent, or Firm—Maleson, Rosenberg & Bilker

[57] ABSTRACT

An improved thermometer which is case hardened and includes a total enclosure composed of a pair of first and second layer members covering the stem portion and the bulb portion respectively of the thermometer. A substantially transparent plastic material layer member covers the stem portion of the improved thermometer and has an index of refraction which is sufficiently high to allow a user to visually interpret the location of an internally contained heat expandable substance in relation to indicia formed on the stem portion. Additionally, the first layer member is irradiated from a source of soft Beta rays for hardening the outer surface layer of the first layer member. The bulb section of the improved thermometer is enclosed by a second thermally conductive layer member. Both the first and second layer members are joined to form a total enclosure for the thermometer throughout the extended length of both the bulb and stem portions. Additionally, an increased amount of substantially transparent plastic material is added to the terminal end of the stem portion of the improved thermometer in order to provide a cushioning effect under dynamic load when the thermometer inadvertently falls to an external surface.

18 Claims, 8 Drawing Figures

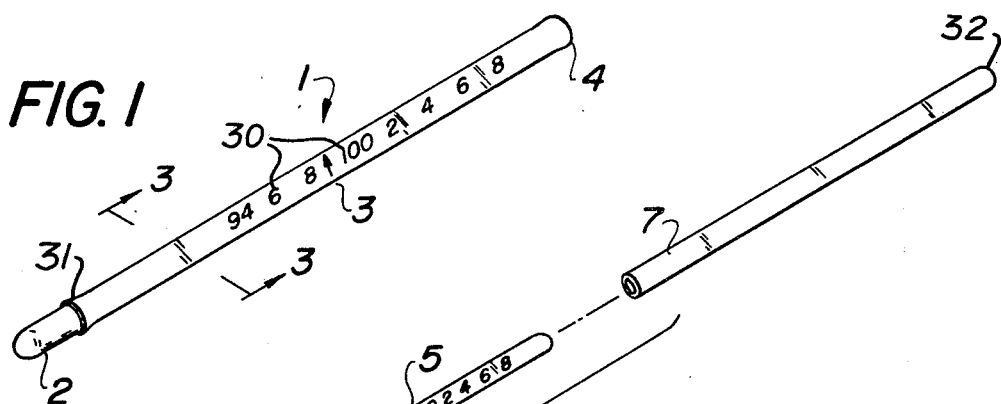
FIG. 1
FIG. 2
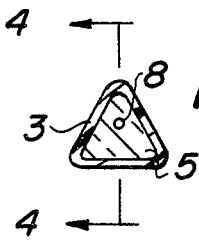
FIG. 3
FIG. 4
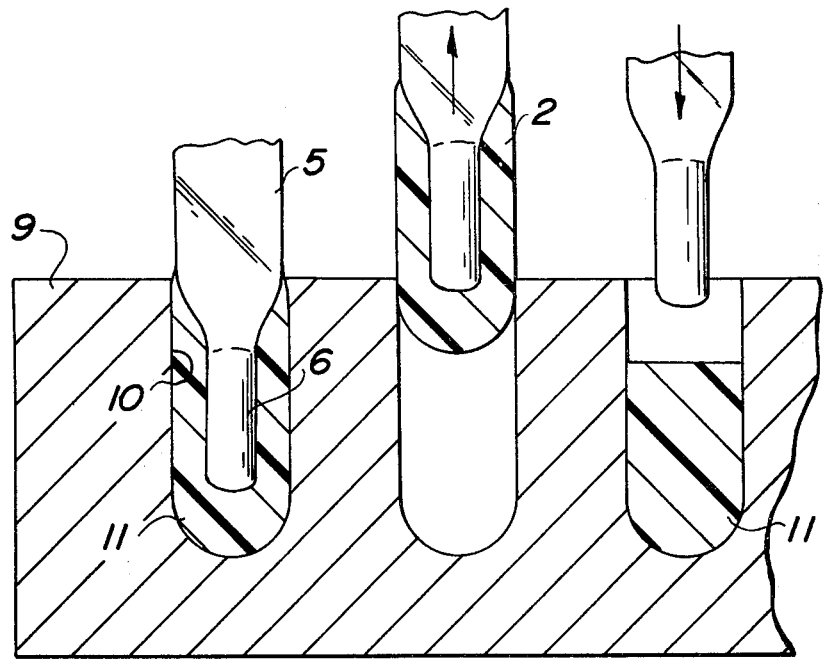
FIG. 5

CASE HARDENED THERMOMETER

RELATED APPLICATIONS

This application is a continuation-in-part of U.S. patent application Ser. No. 620,586, filed Oct. 8, 1975, now U.S. Pat. No. 4,044,614.

BACKGROUND OF THE INVENTION

1. Field of the Invention

This invention pertains to heat transfer measurement devices. In particular, this invention relates to thermometers. Still further, this invention pertains to thermometers which are inserted into a body cavity of a user. Additionally, this invention relates to thermometers for reducing the effects of static and dynamic loads applied to such thermometers when in use while simultaneously maintaining a short time interval for temperature read-out. More in particular, this invention relates to thermometers having two layer members placed over the bulb portion and the stem portion of a standard thermometer respectively. More in particular, this invention relates to a thermometer having a first and a second layer member sections enclosing the thermometer and further having one of the sections irradiated for case hardening the outer surface of the layer member.

2. Prior Art

Thermometers inserted into body cavities for measuring temperatures of the users are well-known in the art. However, in some prior thermometer systems, the stem portion of the thermometers are made of glass. Glass is generally brittle in nature and has been found to be very poor in absorbing dynamic loads. Thus, when such prior art glass thermometers have fallen to an external surface they have been generally found to break. Such breakage has increased the cost of using such prior thermometer systems. Additionally, such prior glass thermometer systems have been found in some cases to break when inserted rectally into a small child whos stationary position cannot be assured during the taking of the temperature. In some such cases, it has been found that the thermometer has shattered, leaving splinters including mercury internal to the body cavity. This has caused a safety hazard to arrive when using such prior thermometer systems.

In some prior glass thermometer systems, when the thermometer is inadvertently dropped, the glass has been found to shatter when it strikes an external surface. This has led to splinter elements of glass and mercury being dispersed over a wide area. Such has proved to be a safety hazard in the event that splinters of glass and mercury may in some cases be found to impregnate the skin or mucous membrane of a person.

In some prior thermometer systems, a plastic coating has been applied to the entire thermometer area including the bulb and stem portion. However, due to the low thermal conductivity of the plastic coatings involved, there has been found an increased time interval in the amount of time necessary to take the temperature when such prior thermometer systems are inserted within a body cavity. This has been found to be especially disadvantageous when the temperature of a child is being taken due to the fact that the child's immobility may not be assured for any great length of time.

Additionally, in such prior art systems where a single coating of plastic is applied throughout the thermometer, it has been found that when such thermometers are clenched between the teeth, that the surface of such thermometers are pierced. In such prior thermometer systems, the surface of the plastic is relatively soft and memory limited and when the plastic is pierced, bacteria and other unwanted agents may be deposited in the cavities formed in the thermometer surface resulting in disadvantageous and unwanted extraneous materials on and in the thermometer system.

SUMMARY OF THE INVENTION

A thermometer having a bulb portion and a stem portion which includes a first layer member enclosing the stem portion of the thermometer. The first layer has an index of refraction sufficiently high to provide visual interpretation of the positional location of an internally contained heat expandable substance in relation to indicia formed on the stem portion. The first layer is radioactively irradiated for surface hardening of the first layer member. A second thermally conductive resilient layer member encloses the bulb portion of the thermometer. The second layer member is separate and distinct from the first layer member. Both of the first and second layers are joined to form a closed contour enclosure for the thermometer throughout an extended length of the thermometer. The first and second layer members are secured to the stem and the bulb portion and each to the other for providing contiguous contact of the layers with an outer surface of the thermometer throughout the extended length of the thermometer. The first and second layer members are non-removeably secured to the outer surface of the thermometer.

BRIEF DESCRIPTION OF THE DRAWINGS

FIG. 1 is a perspective view of the improved thermometer showing both the bulb cover and the plastic stem cover;

FIG. 2 is an exploded view in perspective of the improved thermometer showing clear plastic tubing utilized in one form of the invention as a stem cover;

FIG. 3 is a sectional view of the improved thermometer taken along the section line 3—3 of FIG. 1;

FIG. 4 is a sectional view of the improved thermometer taken along the section line 4—4 of FIG. 3;

FIG. 5 is an elevational view of a mold depicting the method steps employed in coating the bulb end of the thermometer with the second layer member having a thermally conductive coating;

DESCRIPTION OF PREFERRED EMBODIMENTS

Figure 6:
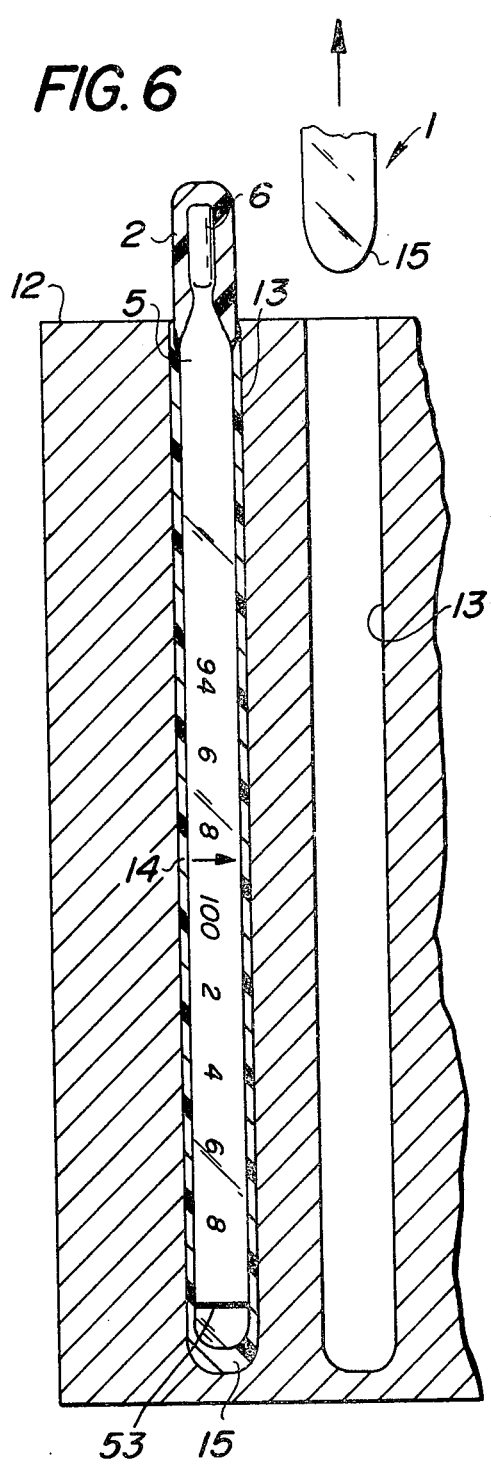
FIG. 6 is an elevational view of a dip mold depicting the method steps involved in dip molding the first layer over the stem portion of the thermometer.

Referring now to FIGS. 1, 3 and 4 there is shown improved case hardened thermometer 1 formed of bulb portion 6 and stem portion 5. In general, thermometer 1 may be of the glass type applicable either for oral or rectal use. Additionally, thermometer 1 includes an internally contained heat expandable substance within bore 8. The heat expandable substance which may be mercury or other gaseous or liquid expansible material is contained in or in the neighborhood of bulb 6 and is adapted to expand in a generally linearly fashion within bore 8 when heat is applied in the vicinity of thermometer bulb portion 6. As is the usual case, the heat expandable substance when thermal gradients are applied expands within bore 8 in order to provide a visual interpretation of the positional location of the expanding substance in relation to indicia 30 formed on stem portion 5 of thermometer 1.

In overall concept, improved thermometer 1 allows for a temperature reading mechanism which may be used orally or rectally and which has the advantageous properties of being able to operatively absorb large static as well as dynamic stress loadings than prior thermometers. Additionally, it has been found, as will be detailed in following paragraphs, that even when improved thermometer 1 has been stressed to its ultimate stress limits, and glass stem portion 5 has been broken, that glass splinters are generally maintained internal to enclosure layers 2 and 3 to provide a shatter proof mechanism. Further, means are provided such that when improved thermometer 1 is dropped or otherwise falls to an external surface, impact is generally taken at reinforced areas having a greater resiliency than the glass portions in order to cushion the impact shock and minimize the possibility of breakage.

In another context, improved thermometer 1 has been found to optimize stress loading conditions which may be applied to thermometer 1 when in use while simultaneously minimizing the effects of heat transfer insulation to allow for a thermometer temperature readout in a minimal time interval after thermometer 1 is inserted into a body cavity of the user.

It has been further found that advantageous results are obtained by irradiating thermometer 1 with an X-ray source of soft Beta rays. When a plastic is used for first layer or cover 3, and such is irradiated, there is formed a highly dense cross-linkage of molecules occuring at the peripheral boundary surface which has the effect of case hardening thermometer 1. It has been found that irradiation of this type causes the cross-linkage of molecules without changing the properties under the surface of first layer member 3. In this manner, thermometer 1 has essentially become scratch proof and abrasion resistant due to the surface hardening effects. This case hardening has been found advantageous when used in an oral type insertion environment. There has been found some denting of prior plastic covers and the case hardening has alleviated this surface failure generally found when thermometer 1 is clenched in the teeth of a user.

Improved thermometer 1 includes first layer or stem cover 3 which encloses stem portion 5 of thermometer 1. First layer or cover 3 is composed of a material which is substantially transparent and includes an index of refraction sufficiently high to provide visual interpretation of the positional location of an internally contained heat expandable substance in relation to indicia 30 formed on or within stem portion 5. Thermally conductive second layer or bulb cover 2 encloses and is adhered to bulb portion 6 of improved thermometer 1. Both first and second layers 3 and 2 are joined at interface area 31 to form a total enclosure for thermometer 1 throughout the extended length of improved thermometer 1. Thus, thermometer bulb 6 as well as thermometer stem 5 are provided with a discontinuous enclosure of bulb cover or second layer 2 in contact with stem cover or first layer 3 generally having different and distinct optical, mechanical, and thermodynamic properties. An electron beam gun, well known in the art, is utilized as an electron source for soft Beta rays to be applied to first layer member 3. In general, less than 2.0 megarads are applied to provide hardness depths of between 1.0–2.0 microns into the surface of first layer member 3. It has been found that when first layer member 3 is a plastic material, such is conducive to radioactive irradiation for increasing the surface hardness of first layer member 3. Energy sources capable of effecting these conditions under high production are well known in the art. Ionizing radiation has assumed a significant role in the modification of various plastic materials. In other uses, electron beam irradiation of wire insulated by polyethylene or polyvinyl chloride formulations has been found to be an important mechanism in the upgrading of the properties of such insulations at higher temperatures. As in the case of improved thermometer 1, ionizing radiation induces chemical reaction that leads to the cross-linking of polymer chains to form a network having advantageous surface properties.

The discontinuous enclosure for bulb portion 6 and stem portion 5 is important in that each portion of the enclosure is chosen for specific and sometimes divergent properties. First layer 3 has essential optical properties such as a high order of transparency in order that indicia 30 may be easily read. Additionally, first layer 3 is generally more resilient than the glass portion making up stem 5 in order that greater static as well as dynamic load may be entertained without the breaking of stem 5 as has occurred in prior thermometers.

Further, the resiliency of first layer or stem cover 3 provides for an enclosure where even if stem portion 5 were to be subjected to sufficient stress loads which were to cause a stress failure, that the enclosure provided by layer 3 would minimize the possibility of the glass within stem portion 5 shattering dispersing splinters of glass. In order to provide both mechanical as well as the optical properties necessary for stem cover or first layer member 3, a wide variety of standard plastic materials may be utilized in improved thermometer 1.

As an example, clear thermosetting high molecularly polymeric compounds have been successfully used to provide the material properties of cover 3. Such thermosetting polymers are characterized by becoming hard and infusible after being subjected to heat and pressure. Additionally, clear thermo-plastic polymers have also been utilized and are characterized by having the property of softening under heat and pressure and being reversible with respect to the softening property. The thermo-plastic found to be applicable may be molded in a rather simple and standard fashion and include the principal groups of vinyls, polystyrenes, polyethylenes, cellulosics, as well as other polyamides.

A number of plastic materials of the nature provided in the previous paragraphs may be utilized with the basic restriction that they be transparent in order to allow a simple and efficient reading of indicia 30. In order to provide for sufficient stress loading capabilities without becoming burdensome in handling, plastic covers 3 have been found to be useful when having a wall thickness within the approximating range of between 5.0–20.0 mils of an inch.

Bulb cover or second layer 2 provides a covering element for bulb portion 6 and does not necessitate the property of transparency as is necessary for stem cover 3. However, whereas stem cover 3 is composed of plastic materials generally having a low thermal conductivity, one of the important properties of second layer 2 is that the thermal conductivity be as high as possible in order that the heat generated, from the user, when the thermometer 1 is inserted in a body cavity, be transmitted to the heat expandable substance in a short interval of time.

Thus, second layer member 2 is generally formed of a thermally conductive resilient material. One material utilized for second layer 2 is STYCAST 2850KT which is a castable epoxy with a high thermal conductivity. This material is produced by Emerson and Cumings, Inc., Canton, Mass. This particular castable epoxy has a measured thermal conductivity of 30.0BTU-in/HR-FT$^2$-°F. and has been successfully utilized to maximize the expansion rate of the heat expandable substance within thermometer bore 8.

Additionally, other plastic materials have been utilized which are impregnated with a high thermal conductivity powder. Such plastic materials include powders and suspensions composed of particulates of silver, gold, aluminum, as well as copper and boron nitride. Additionally, opaque thermally conductive silicone rubber has been adantageously used for cover member 2. The resiliency of the silicone rubber provides excellent shock resistant properties and has been found to serve as a closed receptacle for the mercury when bulb 6 is finally stressed to its breaking point.

In this manner, there is provided an improved thermometer 1 which includes a two part enclosure for bulb portion 6 and thermometer stem 5 respectively. Each section of enclosure 2 and 3 provide for the necessary mechanical as well as optical properties necessary for that portion of improved thermometer 1 which it encloses.

Stem cover or first layer 3 further includes terminal closed end section or extended plastic end for mating with a terminal end of stem portion 5 when stem 5 is positionally located within first layer 3. As can be clearly seen in FIG. 4, extended plastic end 4 has a greater wall thickness than that provided for the portion of first layer 3 which is in contiguous contact with thermometer stem 5 throughout the rest of the extended length of stem portion 5.

Terminal closed end section 4 of first layer 3 may include a bulbous contour or some other type of geometrical type of variation which would permit an increased wall thickness at the terminal end of improved thermometer 1. Extended plastic end 4 of layer 3 is provided due to the fact that it has been found through empirical experimentation that a great majority of impact loadings occur on the terminal end of improved thermometer 1.

In one form of the invention, as is clearly shown in FIG. 2, first member layer or stem cover 3 is formed of clear plastic tubing 7. Clear tubing 7 includes closed end 32 and provides for tubing 7 to be inserted over thermometer stem portion 5. Clear tubing 7 includes an internal dimension opening which is adapted to receive stem portion 5 of improved thermometer 1. In this form of the invention, clear tubing 7 may be formed of a clear heat shrinkable plastic, well known in the art. In this manner, it has been found tubing 7 may be easily inserted over thermometer stem portion 5 and then heated to permit shrinkage of tubing 7 over stem portion 5. It will be noted then that tubing 7 is secured to thermometer 1 but is still unbonded and compression loaded. Methods of shrinking other than heating which are known in the art may alternatively be used to shrink. These include cold shrinking and chemical shrinking.

Use of such tubing has been found advantageous when the cross-section of stem portion 5 of thermometer 1 is not generally circular. In many forms of construction, thermometers 1 are in generally triangular cross-sectional area as is shown in FIG. 3, and the use of heat shrinkable tubing has been found to be useful in that such heat shrinkable plastic generally conform to the contour of the outer periphery of stem portion 5. Additionally, when tubing 7 is secured but unbonded from thermometer 1, there is the advantageous result of tubing 7 being non-removable from thermometer 1 while at the same time allowing for movement between thermometer 1 and tubing 7 in the event of high stress breakage conditions. Thus, the glass of thermometer 1 may be broken under high impact loading conditions, while tubing 7 may still be resilient and contain particles of glass and mercury internal to tubing 7.

In another form of the invention, clear tubing 7 may include a through opening passing throughout its extended length. After insertion of stem 5 within the through opening, tubing 7 may be plugged or otherwise closed through heat treatment or some like technique at the terminal end of stem portion 5.

In another form of the invention, improved thermometer 1 may also include a stress riser which is formed on a portion of thermometer stem 5 which is generally external to the body cavity when improved thermometer 1 is in use. Such a stress riser may be in the form of a notched area passing around the periphery of stem portion 5 of thermometer 1 in the neighborhood of tubular element end 32.

Thus, with a stress riser present and thermometer 1 being inserted into a body cavity, a resultant stress load sufficient to break the thermometer 1, would cause cracking or breakage in a section which would not be detrimental to the health of the user.

In order to provide a smooth or more planar interface area 31 where layers 2 and 3 are joined, layer or stem cover 3 may be tapered at the joining end section. This would have the effect of producing a more continuous contour interface area 31. In another embodiment, layer or cover 3 may be provided with a reduced outer diameter area in the section near interface area 31. Bulb cover 2 may then be fitted over the reduced outer diameter area of layer 3 and bonded thereto by a molding process or some like securing technique.

Referring now to FIGS. 5–8, there is shown a multiplicity of methods for producing improved case hardened thermometer 1. In overall concept, thermally conductive second layer member 2 is formed over bulb portion 6 of improved thermometer 1. Stem portion 5 is enclosed within substantially transparent first layer member or stem cover 3 with the first and second layer members 3 and 2 being joined to form an enclosure for improved case hardened thermometer 1.

FIG. 5 details the step of forming thermally conductive or second layer member 2 by coating bulb portion 6 of improved thermometer 1 with a thermally conductive material as has hereinbefore been described. Bulb mold material 11 which may be a plastic material impregnated with a high thermal conductivity powder or a high thermal conductivity silicone rubber is initially placed in bulb mold cavity 10 of bulb mold 9.

Bulb mold 11 is generally maintained in a substantially liquid state prior to the insertion of bulb portion 6 of thermometer 1. Bulb portion 6 may be maintained within bulb mold material or second layer material for a predetermined time until the material is in a substantially hardened state and is secured to bulb portion 6. Coated bulb portion 6 is then withdrawn from bulb mold cavity 10 to provide bulb portion 6 with bulb cover or second layer member 2.

In still another form of the invention, the step of molding may include the step of providing a gelatin mold having a predetermined contour cavity somewhat similar to bulb mold cavity 10 shown in FIG. 5 In this form, bulb portion 6 is inserted into bulb mold material 11 contained within the gelatin mold. As is to be understood, bulb portion 6 is maintained in the gelatin mold until the mold material 11 adheres to the bulb portion 6 and hardens. Following this step, the gelatin mold outer casing is dissolved. Thus there is provided bulb cover 2 for bulb portion 6 as has hereinbefore been described. The bulb cover 2, which is the second layer member, is bonded to the bulb portion 6.

In another form of the invention, first layer member or stem cover 3 may be applied by a dip-molding process as is shown in FIG. 6. In this method, stem portion 5 of improved thermometer 1 is inserted into dip mold cavity 13 of dip mold 12. Clear plastic molding material 14 has been inserted into dip mold cavity 13 prior to the insertion of stem portion 5. The stem is provided with a clear release material before dip-molding. Such release materials are known, for example teflon, and serve to prevent bonding.

Molding material 14 is then displaced within mold cavity 13 to encompass stem portion 5 after insertion of improved thermometer 1 into mold cavity 13. Molding material 14 is then allowed to harden prior to the removal of improved thermometer 1 from cavity 13.

Subsequent to the insertion of stem portion 5 to the required depth within mold cavity 13, it is seen that the terminal end of stem portion 5 is provided with a larger clearance between the thermometer end and the lower cavity wall than the clearance on the peripheral boundary of stem portion 5. This permits plastic covering 15 at the terminal end of stem portion 5 to have a greater thickness of molding material 14 adhered thereto than is found on the periphery of the stem portion 5 at areas removed from the stem portion terminal end. As has hereinbefore been described, first layer member 3 may then be irradiated from a Beta source for case hardening of the outer surface of the plastic material.

Figure 7:
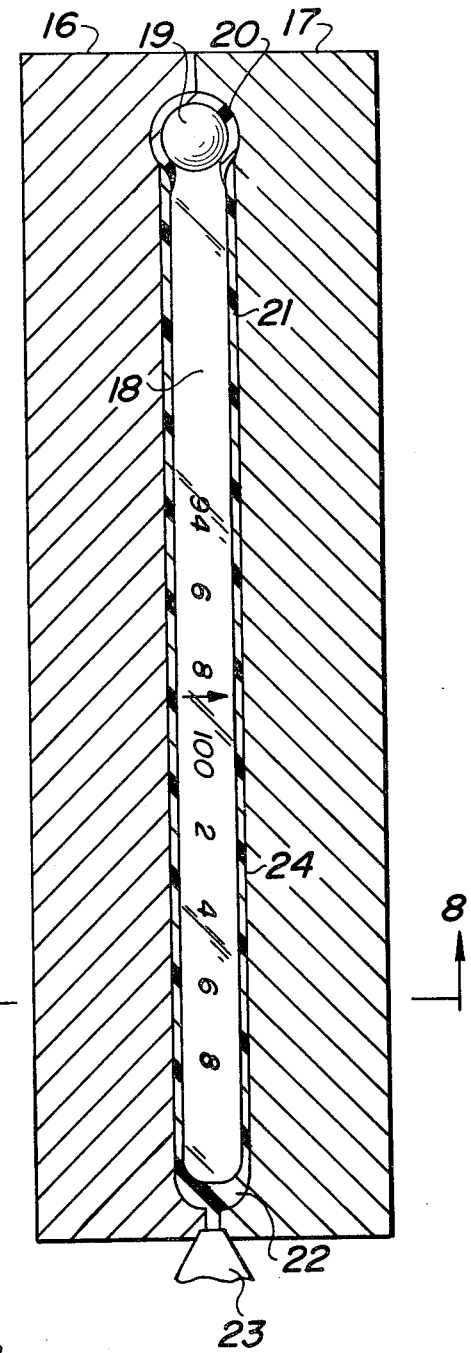
FIG. 7 is an elevational view of a mold used in an extrusion molding process to provide the enclosing first layer over the stem portion of the thermometer; and, FIG. 8 is a sectional view of the extrusion mold taken along the section line 8—8 of FIG. 7.
Figure 8:
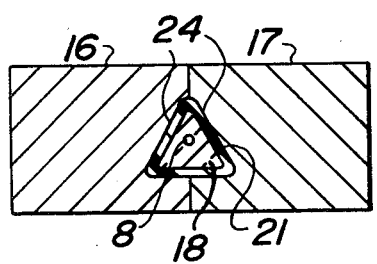

FIGS. 7 and 8 provide for another method of providing layer or stem cover 3 on stem portion 5 of improved thermometer 1. The method steps as depicted in FIGS. 7 and 8 relate to an extrusion type of molding process. In this process, rectal thermometer 18 is inserted within two halves of extrusion mold 16 and 17 having provided therein two halves of extrusion cavity mold 24. Rectal thermometer bulb section 19 includes bulb plastic coating 20 which is formed thereon in some like manner to that which has hereinbefore been described. Clear plastic molding material is inserted under pressure through extrusion mold nozzle 23 and fills the clearance between rectal thermometer 18 peripheral boundary and the internal walls of extrusion cavity 24. Cavity 24 includes a thickened plastic section 22 at the rectal thermometer terminal end to provide for the extended plastic area at the terminal end of rectal thermometer 18.

Another method of hardening the plastic surface is to polish or burnish it with rouge.

Although this invention has been described in connection with specific forms and embodiments thereof, it will be appreciated that various modifications other than those discussed above may be resorted to without departing from the spirit or the scope of the invention. For example, equivalent elements may be substituted for those specifically shown and described, certain features may be used independently of other features, and in certain cases, particular locations of elements may be reversed or interposed all without departing from the spirit or the scope of the invention as defined in the appended claims.

What is claimed is:

1. A thermometer having a bulb portion and a stem portion comprising:
   (a) first layer member enclosing said stem portion of said thermometer, said first layer having an index of refraction sufficiently high to provide visual interpretation of the positional location of an internally contained heat expandable substance in relation to indicia formed on said stem portion, said first layer being radioactively irradiated with soft Beta rays having a value less than 2.0 megarads for surface hardening said first layer member, said hardening being to a depth between 1-2 microns; and,
   (b) a second thermally conductive resilient layer member enclosing said bulb portion of said thermometer, said second layer member being separate and distinct from said first layer member, said first and second layers being joined to form a closed contour enclosure for said thermometer throughout an extended length of said thermometer, said first and second layer members being secured to said stem and bulb portion and each to the other for providing contiguous contact of said layers with an outer surface of said thermometer throughout said extended length of said thermometer, said first and second layer member being non-removeably secured to said outer surface of said thermometer.

2. A thermometer having a bulb portion and a stem portion comprising:
   (a) a first layer member enclosing said stem portion of said thermometer, said first layer having an index of refraction sufficiently high to provide visual interpretation of the positional location of an internally contained heat expandable substance in relation to indicia formed on said stem portion, said first layer being radioactively irradiated for surface hardening said first layer member; and,
   (b) a second thermally conductive resilient layer member formed of a high thermal conductivity silicone rubber impregnated with a high thermal conductivity powder enclosing said bulb portion of said thermometer, said second layer member being separate and distinct from said first layer member, and forming a bulb cover, said bulb cover having a higher resiliency than said bulb portion of said thermometer, said first and second layers being joined to form a closed contour enclosure for said thermometer throughout an extended length of said thermometer, said first and second layer members being secured to said stem and bulb portion and each to the other for providing contiguous contact of said layers with an outer surface of said thermometer throughout said extended length of said thermometer, said first and second layer member being non-removeably secured to said outer surface of said thermometer.

3. A method of producing a thermometer having a bulb portion and a stem portion including the steps of:

(a) forming a thermally conductive second layer over said bulb portion of said thermometer;

(b) enclosing said stem portion of said thermometer within a substantially transparent first layer, said first and second layers being joined to form an enclosure for said thermometer; and, (c) irradiating said first layer with soft Beta rays having a value of less than 2.0 megarads to form a high density cross-linkage of molecules at said first layer member peripheral surface hardened to a depth of between 1.0-2.0 microns.

4. The method of producing a thermometer as recited in claim 3 where the step of forming said thermally conductive layer includes the step of coating said bulb portion with a thermally conductive material.

5. The method of producing a thermometer as recited in claim 4 where the step of coating includes the step of establishing a second layer composed of a plastic material impregnated with a high thermal conductivity powder.

6. The method of producing a thermometer as recited in claim 4 where the step of coating includes the step of establishing said second layer being composed of a high thermal conductivity silicone rubber.

7. The method of producing a thermometer as recited in claim 3 where the step of forming said thermally conductive layer includes the step of molding said bulb portion of said thermometer to said second layer.

8. The method of producing a thermometer as recited in claim 7 where the step of molding includes the step of inserting said bulb portion of said thermometer into a mold die cavity containing a thermally conductive second layer material in a liquid state.

9. The method of producing a thermometer as recited in claim 8 where the step of inserting is followed by the step of maintaining said bulb portion of said thermometer within said second layer for a predetermined time whereby said material is in a hardened state and adheres to said bulb portion.

10. The method of producing a thermometer as recited in claim 9 where the step of maintaining is followed by the step of removing said bulb portion and formed second layer from said mold die cavity.

11. The method of producing a thermometer as recited in claim 7 where the step of molding includes the step of providing a gelatin mold having a predetermined contour cavity.

12. The method of producing a thermometer as recited in claim 11 where the step of providing a gelatin mold is followed by inserting said bulb portion of said thermometer into said thermally conductive second layer material in a liquid state contained within said cavity.

13. The method of producing a thermometer as recited in claim 12 where the step of inserting is followed by the step of dissolving said gelatin mold subsequent to said second layer being in a hardened state.

14. The method of producing a thermometer as recited in claim 3 where the step of enclosing said stem portion includes the step of inserting said stem portion within a tubular heat shrinkable element having a closed end section.

15. The method of producing a thermometer as recited in claim 14 where the step of inserting said stem portion is followed by the step of applying heat to said tubular element for shrinking said tubular element into continuous contact with an outer surface of said stem portion of said thermometer.

16. The method of producing a thermometer as recited in claim 3 where the step of enclosing said stem portion includes the step of coating said stem portion with said substantially transparent first layer.

17. The method of producing a thermometer as recited in claim 16 where the step of coating includes the step of dip-molding said stem portion within a mold cavity containing substantially transparent plastic material.

18. The method of producing a thermometer as recited in claim 16 where the step of coating includes the step of extrusion molding said stem portion with substantially transprent plastic material forming said first layer.

* * * * *